United States Patent [19]

Lew et al.

[11] Patent Number: 5,675,091
[45] Date of Patent: Oct. 7, 1997

[54] STEP-WISE TRACKING ELECTRONIC FILTER WITH OFFSET UP AND DOWN TRANSITION

[76] Inventors: Hyok S. Lew; Yon S. Lew; Hyon S. Lew, all of 7890 Oak St., Arvada, Colo. 80005

[21] Appl. No.: 488,966

[22] Filed: Jun. 8, 1995

Related U.S. Application Data

[63] Continuation-in-part of Ser. No. 488,603, Jun. 8, 1995, Pat. No. 5,591,923, which is a continuation of Ser. No. 270,820, Jul. 5, 1994, Pat. No. 5,435,188, which is a continuation-in-part of Ser. No. 113,197, Aug. 30, 1993, Pat. No. 5,351,556, which is a continuation-in-part of Ser. No. 848,291, Mar. 9, 1992, Pat. No. 5,309,771, and Ser. No. 164,925, Dec. 10, 1993, Pat. No. 5,419,189.

[51] Int. Cl.$^6$ .............................................. G01F 1/32
[52] U.S. Cl. ................................................. 73/861.22
[58] Field of Search ........................... 73/861.21, 861.22, 73/861.23, 861.24, 861.18; 328/137, 138, 140, 167; 307/520, 522, 524

[56] References Cited

U.S. PATENT DOCUMENTS

| | | | |
|---|---|---|---|
| 3,522,449 | 8/1970 | McMurtrie | 328/154 |
| 3,747,025 | 7/1973 | Iten et al. | 328/167 |
| 4,934,194 | 6/1990 | Itoh et al. | 73/861.22 |
| 4,966,040 | 10/1990 | Ohmae | 73/861.22 |

*Primary Examiner*—Richard Chilcot
*Assistant Examiner*—Harshad Patel

[57] ABSTRACT

A step-wise tracking electronic filter comprises a parallel bank of a plurality of band pass filters respectively having a plurality of electronic switches and respectively having different band widths, and a command signal generating device generating a command signal from the frequency of a primary alternating electrical signal being transmitted through the step-wise tracking electronic filter and being conditioned thereby or from an auxiliary alternating electrical signal obtained for the sole purpose of generating the command signal therefrom; wherein the command signal closes one of the plurality of electronic switches belonging to one of the plurality of band pass filters having a band width substantially including the frequency of the primary alternating electrical signal and opens the electronic switch when the band width of the band pass filter substantially excludes the frequency of the primary alternating electrical signal in an operating mode wherein only one electronic switch is closed at a time, and the command signal closes the first of two electronic switches respectively belonging to an adjacent pair of the band pass filters and opens the second of the two electronic switches when the frequency of the primary alternating electrical signal is equal to a first value of a transition frequency, and closes the second of the two electronic switches and opens the first of the two electronic switches when the frequency of the primary alternating electronic signal is equal to a second value of the transition frequency offset from the first value of the transition frequency.

20 Claims, 8 Drawing Sheets

STEP-WISE TRACKING ELECTRONIC FILTER WITH OFFSET UP AND DOWN TRANSITION

This patent application is a Continuation-In-Part Application to patent application Ser. No. 08/488,603, now U.S. Pat. No. 5,591,923, entitled "Electronic Filter for Flowmeters with Compound Control" filed on Jun. 8, 1995, that is a Continuation Application to Ser. No. 08/270,820, now U.S. Pat. No. 5,435,188, filed on Jul. 5, 1994, which application is a Continuation-In-Part Application to Ser. No. 08/113,197, filed on Aug. 30, 1993, that is now U.S. Pat. No. 5,351,556, which had been filed as a Continuation-In-Part Application to Ser. No. 07/848,291, filed on Mar. 9, 1992, now U.S. Pat. No. 5,309,771, and a C-I-P Ser. No. 08/164,925, filed on Dec. 10, 1993, now U.S. Pat. No. 5,419,189.

FIELD OF INVENTION

This invention relates to an electronic filter for conditioning a primary flow signal generated in the form of an alternating electrical signal by a flowmeter such as a vortex flowmeter or turbine flowmeter, which primary flow signal is converted to a flow rate of fluid media moving through a flow passage included in the flowmeter by a data processor, wherein the electronic filter comprises a parallel combination of a plurality of band pass filters, one of which plurality of band pass filters having a bandwidth substantially including the frequency of the primary flow signal is switched on by a command signal generated from the primary flow signal or from an auxiliary flow signal provided by an accessory flow sensor or flow switch. The present invention is characterized by the controlling of transition from one band pass filter to another band pass filter, wherein the command signal voltage switching on one of the plurality of band pass filters and the command signal voltage switching off said one of the plurality of band pass filters are offset from one another, which control of switching on and off each of the plurality of band pass filters prevents an adjacent pair of the band pass filters from being switched on and off in an alternating and cyclic manner when the primary or the auxiliary flow signal generating the command signal controlling the switching on and off of the band pass filters is generated by a flow rate corresponding to the transition value between the adjacent pair of the band pass filter.

BACKGROUND OF INVENTION

With few exceptions, all of the existing versions of the electronic filters conditioning the flow signals such as those provided by the vortex flowmeters employ a parallel bank of band pass filters switched on and off one at a time by a command signal generated from the frequency of the flow signal provided by the vortex flowmeter in the form of an alternating electrical signal, wherein the frequency of the flow signal generating the command signal is detected at the output side of the parallel bank of band pass filters as taught by the conventional wisdom of the feedback control theory. As the frequency of vortex shedding measurable by an advanced-concept up-to-date vortex flowmeters varies in a range from a fraction of a Hz to a few thousand Hz, the conventional feedback method of controlling the parallel bank of band pass filters by using a command signal generated from the frequency of the alternating electrical signal detected at the output side of the parallel bank of the band pass filters does not work, because such a control method tends to make the parallel bank of band pass filters lock on to the noise signal instead of the vortex signal.

In general, the error arising from the distortion of the flow signal of normally harmonic geometry occurring during the transition from a band pass filter to another band pass filter included in the parallel bank of the plurality of band pass filters is negligibly small as long as the transition from one band pass filter to another band pass filter occurs infrequently. However, when the flow of fluid media occurs at a rate that generates the command signal voltage having a value triggering the transition between two adjacent pair of the band pass filters, the transition between the two adjacent pair of the band pass filters can occur in an alternatively and cyclically repeating manner and, consequently, an unacceptably large error in the flow measurement can take place due to the distortion of the flow signal cause by a repeatedly occurring transition between the adjacent pair of the band pass filters.

BRIEF SUMMARY OF INVENTION

Figure 2:
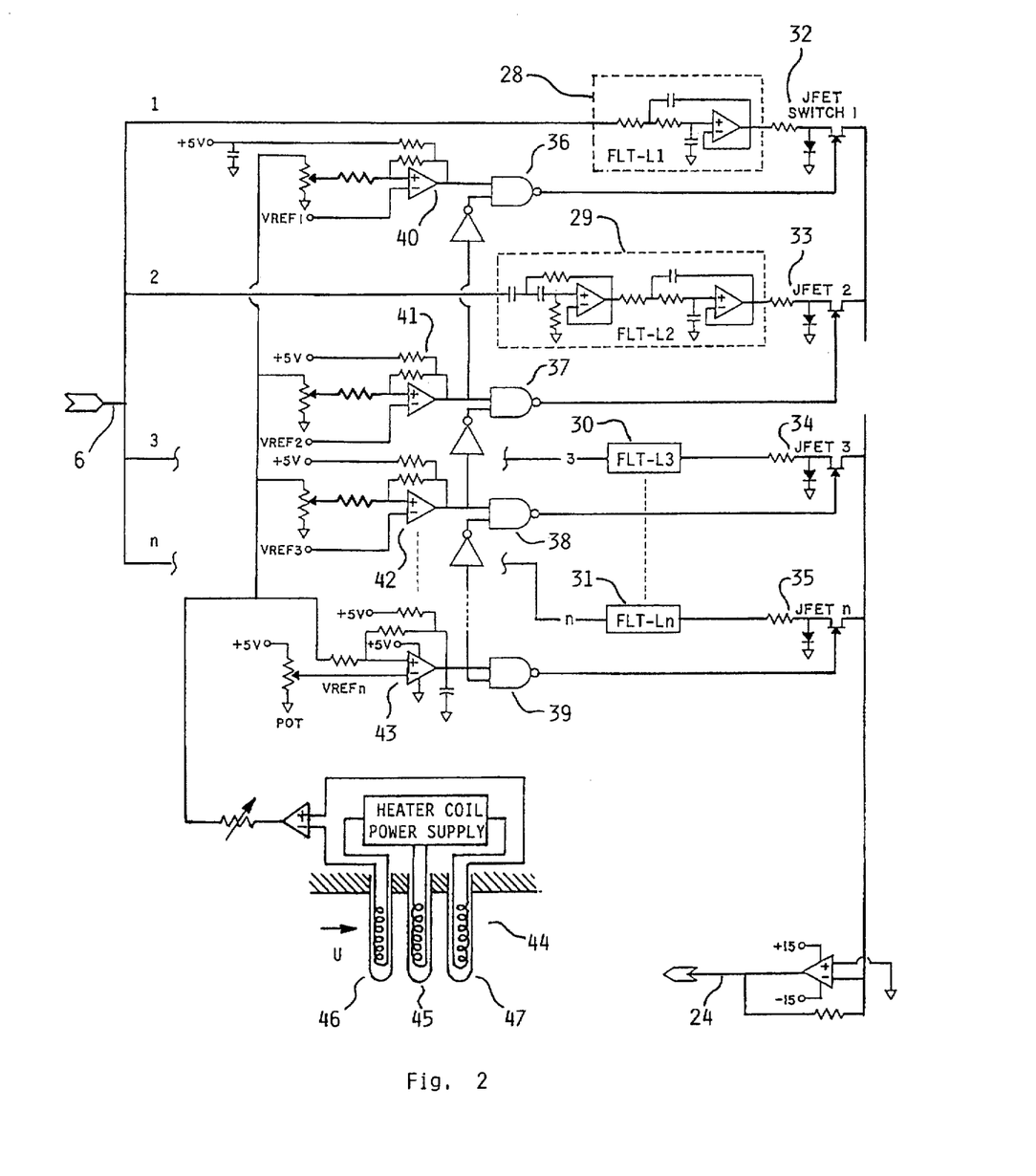
FIG. 2 illustrates a structural embodiment of a parallel bank of band pass filters included in the compound electronic filter shown in FIG. 1 for conditioning the primary flow signal in a very low flow range, that is controlled by a command signal generated from an auxiliary flow signal.

The primary object of the present invention is to provide an electronic filter assembly comprising a parallel combination of a plurality of band pass filters, wherein a command signal generated from the frequency of the primary flow signal provided by the flowmeter measuring the flow rate of fluid media or from an auxiliary flow signal provided by an accessory electromechanical or thermal flow sensor or switch, switches on each of the plurality of band pass filters one at a time when the command signal has a value equal to a first value assigned to the band pass filter and switches off the band pass filter when the command signal has another value equal to a second value assigned to the band pass filter, which first and second values of the command signal assigned to each of the plurality of band pass filters for switching on and off thereof are offset from one another to ensure that there will not occur transition between an adjacent pair of the band pass filters in an alternatively and repeating cyclical manner distorting the substantially harmonic geometry of the primary flow signal providing the flow rate of fluid media. When the command signal controlling the switching on and off of the plurality of the band pass filters is generated from the frequency of the primary flow signal providing the flow rate of fluid media, the frequency of the primary flow signal may be taken at either the input or output side of the electronic filter assembly depending on the design preference. The best result is obtained when a compound version of the electronic filter assembly is employed, wherein the electronic filter assembly comprises a first parallel bank of a small number of band pass filters controlled by a command signal generated from the frequency of the primary flow signal detected at thee-output side of the first parallel bank of the band pass filters, and a second parallel bank of a significant number of band pass filters controlled by a command signal generated from the frequency of the primary flow signal detected at the output side of the first parallel bank of band pass filters and the input side of the second parallel bank of band pass filters, which most desirable version of the electronic filter assembly is illustrated in FIG. 2 of the parent patent application that is now U.S. Pat. No. 5,351,556. The performance of the electronic filter assembly can be further enhanced when the control of the band pass filters covering the lower range of flow rate is executed by a command signal generated from an auxiliary flow signal provided by an accessory flow sensor or switch as illustrated and described in the parent patent application Ser. No. 08/270,820, that is now U.S. Pat. No. 5,435,188, while the control of the band pass filters covering the middle and upper range of flow rate is executed by a command signal generated from the frequency of the primary flow signal provided by the flowmeter measuring the flow rate of fluid media. It should be also pointed out that the first and second values assigned to each of the plurality of band pass filters respectively for switching on and off the band pass filter when the value of the command signal is respectively equal thereto must be offset from one another by a finite and small value for the band pass filters covering the lower range of flow rate, while these first and second values of the command signal may be offset from one another by a very small value or even converge to the same value for the band pass filters covering the middle and upper range of flow rate as the transition between an adjacent pair of the band pass filters occurs less frequently even when the primary flow signal generates a command signal of a value coinciding with the first and second value of the command signal converging to an identical value triggering the transition between the adjacent pair of the band pass filters at the single value of the command signal as long as the adjacent pair of the bandpass filters cover the middle and upper range of flow rate.

Another object is to provide the electronic filter assembly described in the afore-mentioned primary object of the invention that includes an output cut-off electric circuit controlled by a command signal generated from the auxiliary flow signal.

A further object is to provide the electronic filter assembly described in the afore-mentioned primary object that includes an output cut-off electric circuit controlled by a command signal generated from the amplitude of the primary flow signal measured at the output side of the second parallel bank of filters.

Yet another object is to provide the electronic filter assembly described in the afore-mentioned primary object, that includes an output cut-off electric circuit controlled by a command signal generated from the frequency of the primary flow signal measured at the output side of the first or second parallel bank of filters.

Yet a further object is to provide an electronic filter assembly conditioning the primary flow signal such as an alternating electrical signal provided by a vortex flowmeter or turbine flowmeter, that comprises a parallel bank of filters controlled by a command signal generated from an auxiliary flow signal provided by a mechanical or thermal flow sensor or flow indicator, wherein the flow rate of media is determined from the frequency of the primary flow signal measured at the output side of the parallel bank of filters.

Still another object is to provide the electronic filter assembly described in the afore-mentioned yet a further object of the invention, that includes an output cut-off electric circuit controlled by a command signal generated from the auxiliary flow signal, or the amplitude or the frequency of the primary flow signal detected at the output side of the parallel bank of filters.

Still a further object is to provide the electronic filter assembly described in the afore-mentioned yet a further object of the invention, that comprises another parallel bank of filters disposed in a parallel relationship to said a parallel bank of filters, and controlled by a command signal generated from the frequency of the primary flow signal detected at the input or output side of the another parallel bank of filters.

Yet still another object is to provide the electronic filter assembly described in the afore-mentioned a still further object of the invention, that includes an output cut-off electric circuit controlled by a command signal generated from the auxiliary flow signal, or the amplitude or the frequency of the primary flow signal detected at the output side of the parallel bank of filters.

Yet still a further object is to provide the electronic filter assembly conditioning the primary flow signal such as an alternating electrical signal provided by a vortex flowmeter or turbine flowmeter, that comprises a parallel bank of filters controlled by a command signal generated from the frequency of the primary flow signal detected at the input side or output side of the parallel bank of filters, wherein at least the electronic filter or filters covering the lower range of flow rate of fluid media is assigned with a first value of the command signal switching on the electric filter and a second value of the command signal switching off the electronic filter, which first and second values of the command signal are offset from one another by a finite interval.

An additional object is to provide the the electronic filter assembly described in the afore-mentioned yet still a further object of the invention, that includes an output cut-off electric circuit controlled by a command signal generated from an auxiliary flow signal, or the the amplitude or the frequency of the primary flow signal detected at the output side of the parallel bank of filters.

Another additional object is to provide the electronic filter assembly described in the afore-mentioned an additional object of the invention, that comprises another parallel bank of filters disposed in a parallel relationship to said a parallel bank of filters, and controlled by a command signal generated from the frequency of the primary flow signal detected at the input or output side of the another parallel bank of filters, wherein the individual filters included in the another parallel bank of filters may be switched on and off respectively at two different and offset values of the command signal or at a common value of the command signal.

A further additional object is to provide the electronic filter assembly described in the afore-mentioned another additional object of the invention, that includes an output cut-off electric circuit controlled by a command signal generated from the auxiliary flow signal, or the amplitude or the frequency of the primary flow signal detected at the output side of the parallel bank of filters.

DESCRIPTION OF ILLUSTRATED EMBODIMENTS

Figure 1:
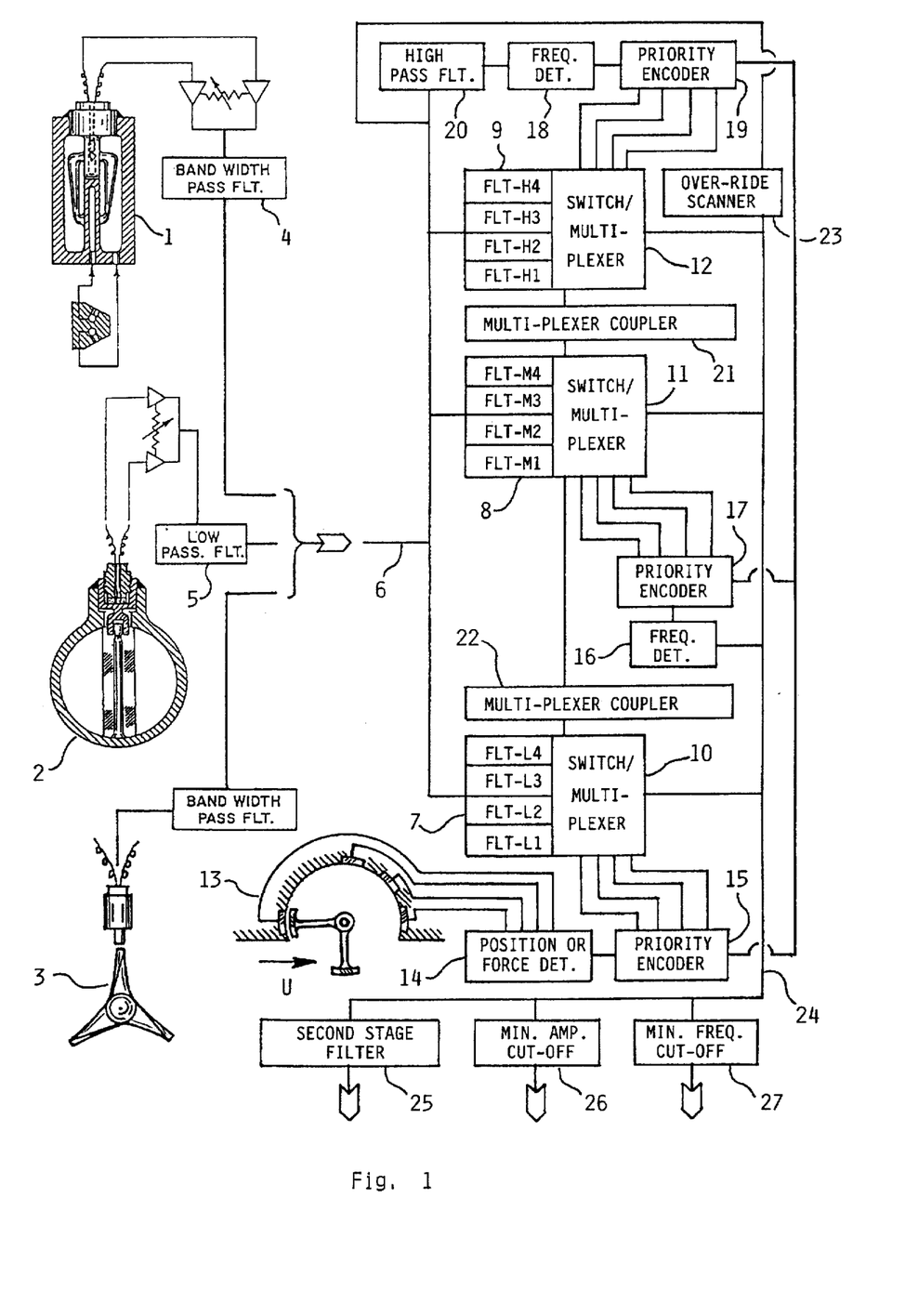
FIG. 1 illustrates a flow diagram showing the operating method and principles of a generalized version of the compound electronic filter of the present invention, that may be operated with or without a second stage parallel bank of filters.

In FIG. 1 there is illustrated a flow diagram of an embodiment of the compound electronic filter conditioning a primary flow signal occurring in the form of an alternating electrical signal generated by a vortex flowmeter or turbine flowmeter, that is called the primary flow signal because the flow rate is determined from that primary flow signal. The primary flow signal generated by a vortex flowmeter 1 or 2, or by a turbine flowmeter 3 in the form of an alternating electrical signal is preconditioned by a prefilter such as a band pass filter 4 or low pass filter 5 having a preset fixed band width with a frequency range covering only the range corresponding to the range of flow measurement, which primary flow signal is supplied to the input end 6 of the compound electronic filter. The compound electronic filter of the present invention selectively transmitting the primary flow signal by tracking or locking onto the frequency of the primary flow signal in a stepwise mode comprises a parallel bank of filters comprising a first set 7 of band pass filters L1 through L4, a second set 8 of band pass filters M1 through M4, and a third set 9 of band pass filters H1 through H4, wherein the three sets 7, 8 and 9 of band pass filters respectively include three switch/multiplexers 10, 11 and 12. Of course, each individual band pass or low pass filter selectively transmits an alternating electrical signal with frequencies distributed within the band width of the band pass or low pass filter. It must be understood that the number of parallel filters included in each of the three sets of band pass filters may vary from a single band pass filter to any plurality of band pass filters depending on the operating requirements and design preference, while the particular illustrative embodiments shows an embodiment wherein each set of band pass filters includes four band pass filters. The individual band pass filters L1–L4, M1–M4 and H1–H4 included in the parallel bank of filters continuously cover the entire range of frequencies of the primary flow signal as the band widths of each adjacent pair of band pass filters over-lap one another extending over frequencies distributed over the boundary frequency between the adjacent pair of band pass filters in a sharply decaying manner. Of course, the band pass or low pass filter L1 covers a band width of the lowest frequencies, L2 covers a band width of the next lowest frequencies and so on, and H4 covers a band width of the highest frequencies. It should be understood that, in an alternative design, the parallel bank of filters may include only one or a pair out of the three sets 7, 8 and 9 of band pass filters instead of all three sets included in the particular illustrative embodiment as the band widths of the individual band pass filters can be selected in such a way that a single or a pair of the sets of band piss filters continuously covers the entire range of frequency of the primary flow signal. Each of the switch/multiplexers 10, 11 and 12 respectively includes a plurality of switches switching on and off one at a time the individual band pass filters included in each of the sets 7, 8 and 9 of the band pass filters, wherein a switch assigned to a band pass filter becomes switched on when a command signal received by the priority encoder controlling the switch/multiplexer is equal to or greater than a specific threshold value assigned to the boundary frequency between that band pass filter and an adjacent band pass filter having a band width of next lower frequencies, and becomes switched off when the command signal is less than the afore-mentioned threshold value or greater than a threshold value assigned to the boundary frequency between that band pass filter and another adjacent band pass filter having a band width of next higher frequencies. The individual band pass filters included in the first set 7 are respectively switched on and off one at a time in the above-described manner by a command signal generated from an auxiliary flow signal provided by a flow sensor or flow indicator 13 that provides a less precise but highly reliable signal representing the levels of fluid flow, which may be a displaceable flap or target triggering on various proximity switches on its path of displacement as shown in the particular illustrative embodiment, or a nondisplaceable target experiencing a fluid dynamic drag or lift force that is converted to an electrical signal, or a thermal flow sensor that converts convective heat transfer to an electrical signal that is included in the embodiment shown in FIG. 2. The flow signal provided by the flow sensor or flow indicator 13 is called the auxiliary flow signal because this auxiliary flow signal is used only to generate a command signal controlling the switching of the individual band pass filters rather than to determine the flow rate. It should be understood that any inexpensive flow sensors, flow indicators, or flowmeters providing a crude but reliable flow signal can be used to generate the auxiliary flow signal. A transducer 14 converts the flow level detected by the flow sensor or flow indicator 13 into a command signal supplied to a priority encoder 15 that controls the switch/multiplexer 10. The function of the priority encoder 15 is to ensure that only one band pass filter is switched on "at a time" (the proper phrasing in English language is "only one filter is switched on at a time" rather than "only one filter is switched on one at a time") and that all other band pass filters are switched off in the previously described manner. In the particular illustrative embodiment, the band pass filter L1 becomes switched on only when the flap or target included in the flow sensor or flow indicator 13 is displaced from the resting position corresponding to zero flow rate and, consequently, the output from the parallel bank of filters remains zero as long as the flow rate is less than a preset minimum value that is set as required by adjusting the bias spring countering the fluid dynamic force on the flap or target. In an alternative design, the band pass filter L1 may stay switched on as long as no other band pass filters are switched on, which arrangement can put out erroneous flow data, particularly in the operation of a vortex flowmeter, as the mechanical vibration of the vortex flowmeter body can produce a non-zero flow rate read out when the actual flow rate is equal to zero. The switching on and off one at a time of the individual band pass filters included in the "set 2 of band pass filters and the set 3 of band pass filters" are controlled by command signals generated from the frequency of the primary flow signal. The frequency detector 16 detects the frequency of the primary flow signal at the output side of the parallel bank of filters and converts the frequency to a command signal, that is sent to a priority encoder 17 controlling the switch/multiplexer 11. The priority encoder 17 ensures that only one band pass filter is switched on at one time in the previously described manner. The frequency detector 18 detects the frequency of the primary flow signal at the input side of the parallel bank of filters and converts the frequency to a command signal, that is sent to the priority encoder 19 controlling the switch/ multiplexer 12, which priority encoder 19 ensures that only one band pass filter is switched on at one time. The high pass filter 20 with a preset fixed band width conditions the primary flow signal supplied to the frequency detector 18, whereby the frequency detector 18 does not miscount the frequency due to the low frequency noise produced by the mechanical vibrations of the flowmeter body and entrained in the primary flow signal. The multiplexer couplers 21 and 22 correlate the operation of all three switch/multiplexers 10, 11 and 12 to each other in such a way that only one of all of the individual band pass filters included in the three sets 7, 8 and 9 of band pass filters is switched on at one time in the previously described manner. A simple form of the multiplexer couplers 21 and 22 can be the integration or interconnection of the three priority encoder 15, 17 and 19 into a single interrelated system, or the supplying of a command signal provided by one of the three command signal generators 14, 16 and 18 to all of the three priority encoders 15, 17 and 19. While the probability of actual occurance is extremely low, there may occur a failure of the step-wise tracking or locking on to the frequency of the primary flow signal in the operation of the parallel bank of filters. In other words, a wrong band pass filter may become erroneously switched on and, consequently, no or very little primary flow signal becomes transmitted through the parallel bank of filters. When the over-ride scanner 23 detects a condition wherein the amplitude of the primary flow signal detected at the input side of the parallel bank of filters is greater than a preset minimum value and the amplitude of the primary flow signal detected at the output side of the parallel bank of filters is less than a preset threshold value, the over-ride scanner generates and supplies a series of ramp dc voltages starting with zero value and ending with a maximum value equal to or greater than the threshold dc voltage assigned to the band pass filter with band width of the highest frequencies to all three priority encoders 15, 17 and 19, whereby switching on and off one at a time of all of the band pass filters included in the parallel bank of filters in a sweep or scanning mode starting with the lowest frequency band pass filter L1 and ending with the highest frequency band pass filter H4, which switching in the sweep or scanning mode is continued until the amplitude of the primary flow signal detected at the output side of the parallel bank of filters becomes greater than the preset threshold value, at which instant the over-ride scanner 23 becomes automatically turned off allowing the regular control of the band pass filters by the command signals generated by the command signal generators 14, 16 and 18 to take over. The output signal 24 from the parallel bank of filters can be supplied to a data processor, that is not shown in FIG. 1, to determine the flow rate, or can be supplied to a second stage parallel bank of filters 25 for a further conditioning before being supplied to a data processor determining the flow rate. In a design wherein the lowest frequency band pass or low pass filter such as the filter L1 stays switched on even when the flow rate becomes zero, the output end of the parallel bank of filters comprising the band pass filters L1 through H4 or from the second stage filter 25 may include a minimum amplitude cut-off circuit 26 that cuts off the output signal when the amplitude thereof is less than a preset minimum value, or a minimum frequency cut-off circuit 27 that cuts off the output signal when the frequency of the output signal is less than a preset minimum value; whereby the noise signal of low amplitude or low frequency created by the mechanical vibrations of the flowmeter body does not create a false nonzero output signal when the actual flow rate is equal to zero. It should be pointed out that the most preferred version of the parallel bank of filters shown in FIG. 1, that provides a high level of performance and yet is economically priced, can be obtained by including two band pass filters in the set 9, two band pass filters in the set 8, and a reasonably small number of band pass filters in the set 7, which preferred version should be used as a first stage filter in conjunction with a second stage filter such as that shown in FIG. 6. In a further economized version of the above-described most preferred version of the parallel bank of filters, both or only one of the sets 7 and 8 of band pass filters may be included in the first stage filter without the set 9 of the band pass filters.

In FIG. 2 there is illustrated a structural embodiment of the first set 7 of band pass filters included in the parallel bank of filters shown in FIG. 1. The primary flow signal is supplied to the input end 6 of the parallel bank of filters. A low pass filter 28 and a plurality of band pass filters 29, 30, 31, etc. constitute the parallel combination or the set 7 of the band pass filters. The plurality of JFET switches 32, 33, 34, 35, etc. respectively assigned to the individual low pass or band pass filters 28, 29, 30, 31, etc. constitute the switch-multiplexer 10. The plurality of combinations of Nand gates and inverters 36, 37, 38, 39, etc., and the plurality of comparators 40, 41, 42, 43, etc. constitute the priority encoder 15. The auxiliary flow signal generating the command signal, that switches on and off the JFET switches 32–35 one at a time in a mode of logic described in conjunction with FIG. 1, is provided by a thermal flow sensor 44 comprising a heater coil 45 disposed intermediate two temperature sensing coils 46 and 47. The temperature difference between the two sensing coils 46 and 47 is converted to a dc voltage that is supplied to the comparators 40–43 respectively defining the threshold voltages respectively switching on the JFET switches 32–35, wherein the threshold voltages respectively defined by an adjacent pair of comparators corresponds to a lower and an upper boundary frequency of the band width of the lower frequency band pass filter of the adjacent pair of band pass filters. It should be noticed that the magnitudes of the threshold dc voltages respectively switching on the band pass filters 29–32 progressively increase from lower frequency band pass filters to the higher frequency band pass filters. The thermal flow sensor 44 is shown in place of the mechanical flow sensor 13 shown in FIG. 1 as the device providing the auxiliary flow signal in order to demonstrate the variety of flow sensors or flow indicators, which can be employed to provide the auxiliary flow signal. For example, in addition to the illustrative example of the flow sensors or flow indicators providing the auxiliary flow signal, a fluid dynamic target flow sensor or a turbine flowmeter can be used to provide the auxiliary flow signal in the operation of a vortex flowmeter in conjunction with the compound electronic filter of the present invention.

Figure 3:
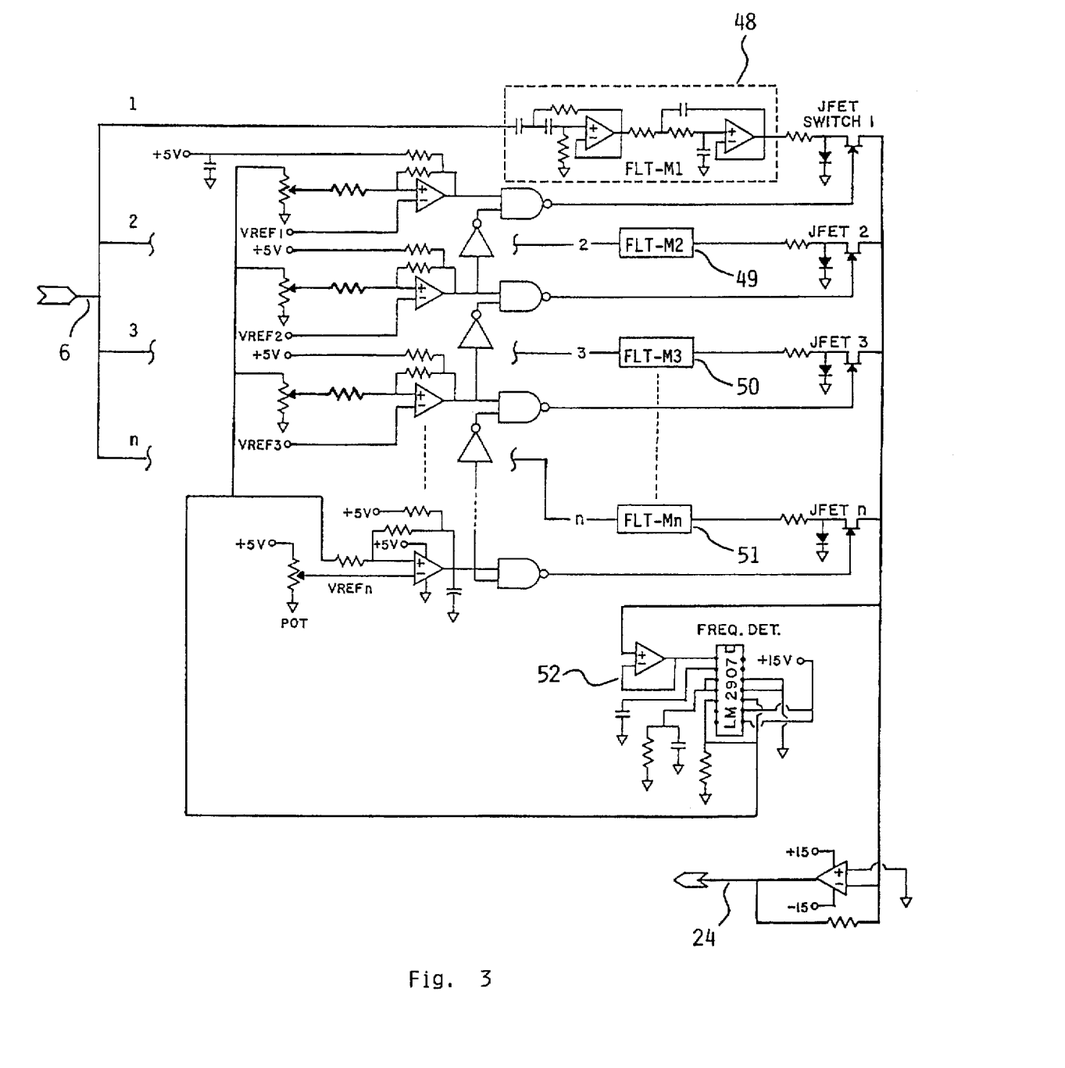
FIG. 3 illustrates a structural embodiment of a parallel bank of band pass filters included in the compound electronic filter shown in FIG. 1 for conditioning the primary flow signal in a low and medium flow range, that is controlled by a command signal generated from the frequency of the primary flow signal detected at the output side of the compound electronic filter.

In FIG. 3 there is illustrated a structural embodiment of the second set 8 of band pass filters included in the parallel bank of filters shown in FIG. 1, which comprises components essentially identical or similar to those shown and described in conjunction with FIG. 2 with the following exceptions: The set 8 of band pass filters comprises all band pass filters 48, 49, 50, 51, etc. without any low pass filters, and the command signal switching on and off one at a time the band pass filters 48–51 is now generated from the frequency of the primary flow signal detected at the output side 24 of the parallel bank of filters by a frequency to voltage converter 52. It should be understood that the threshold dc voltages respectively switching on the band pass filters 48–51 one at a time progressively increase from lower frequency band pass filters to the higher frequency band pass filters. In an alternative embodiment wherein the first set 7 of band pass filters is omitted from the parallel bank of filters shown in FIG. 1, the band pass filter 48 should be replaced by a low pass filter.

Figure 4:
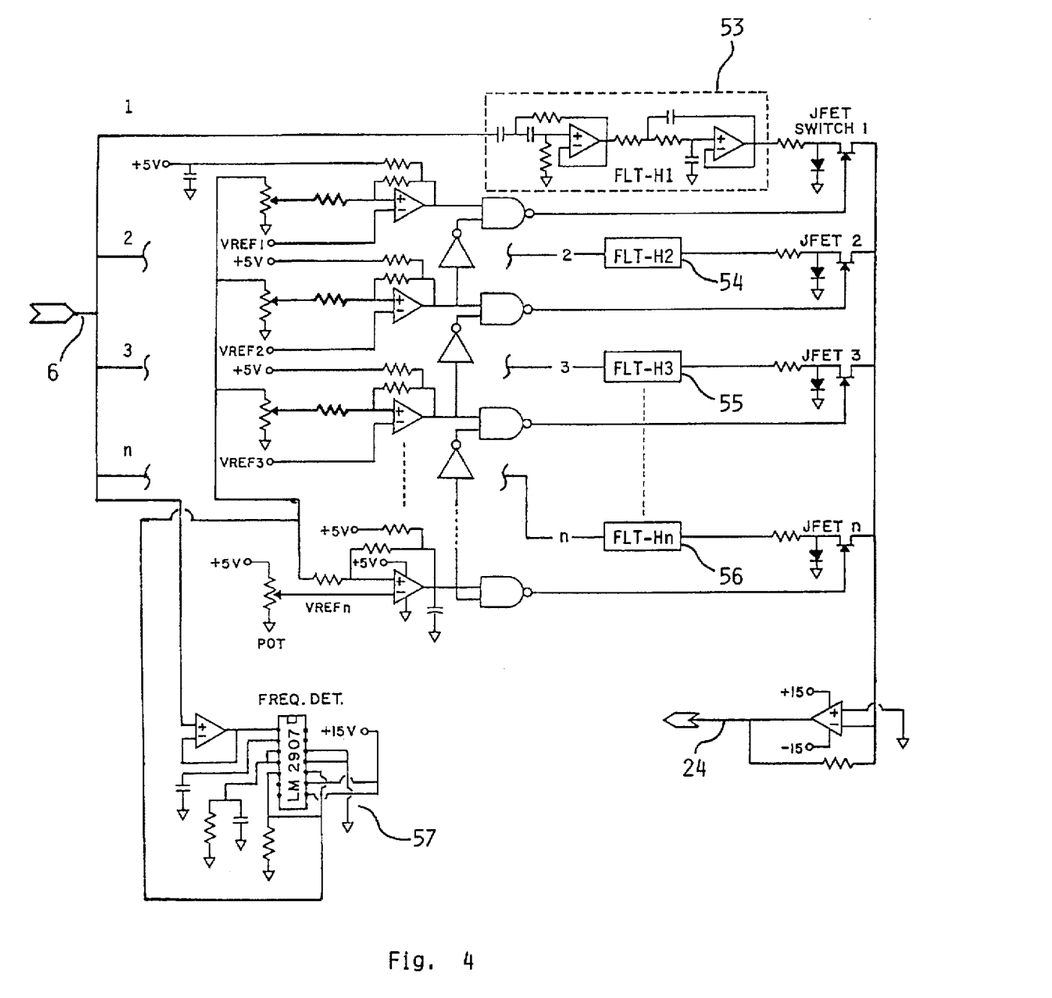
FIG. 4 illustrated a structural embodiment of a parallel bank of band pass filters included in the compound electronic filter shown in FIG. 1 for conditioning the primary flow signal in a medium and high flow range, that is controlled by a command signal generated from the frequency of the primary flow signal detected at the input side of the compound electronic filter.

In FIG. 4 there is illustrated a structural embodiment of the third set 9 of band pass filters included in the parallel bank of filters shown in FIG. 1, which comprises components essentially identical or similar to those shown in FIG. 3. The command signal controlling the switching of the band pass filters 53, 54, 55, 56, etc. is generated from the frequency of the primary flow signal detected at the input side 6 of the parallel bank of filters by the frequency to voltage converter 57. The threshold voltages respectively switching on the band pass filters 53–56 one at a time progressively increase from lower frequency band pass filters to the higher frequency band pass filters. In this particular illustrative embodiment, the high pass filter 20 included in the version shown in FIG. 1 is omitted as the parallel bank of filters work with or without the high pass filter 20.

Figure 5:
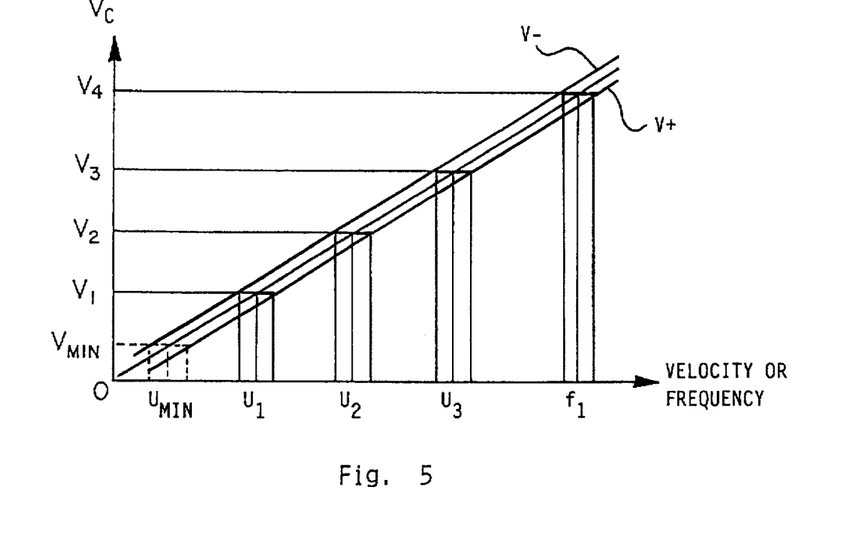
FIG. 5 illustrates principles of the control switching on and off one at a time the individual band pass filters included in the compound electronic filter shown in FIG. 1.

In FIG. 5 there is illustrated the relationship between the sources of the command signal and the threshold values of the command signal switching on various band pass filters constituting a parallel bank of electronic filters. The flow sensor 44 shown in FIG. 2 providing the auxiliary flow signal provides a command signal having a dc voltage equal to $[(V-)+(V+)]/2$, which command signal is generated from the auxiliary flow signal by a command signal generator such as an amplitude-to-voltage converter or frequency-to-voltage converter. The plurality of comparator circuits 40 through 43 respectively controlling the closing and opening of the electronic switches 32 through 35 have hysteresis which add to or subtract from the dc voltage provided by the command signal a predetermined amount of hysteresis voltage depending on the transition of the switching of electronic switches takes place in an upward direction or a downward direction. In other words, when the transition of switching on of a band pass filters occurs in the upward direction due to the increasing value of the command signal voltage resulting from increasing fluid velocity, the actual switching on of various band pass filters occurs following the V+ curve or line shown in FIG. 5, while the actual switching on of various band pass filters occurs following the V− curve or line when the transition of switching on of the band pass filters occurs in the downward direction due to the decreasing value of the command signal voltage resulting from the decreasing fluid velocity. For example, when a lower band pass filter assigned to a velocity range bounded by $U_1$ and $U_2$ is switched on due to increasing velocity of fluid media, the switching on actually occurs at a fluid velocity $U_1+$ slightly greater than the lower bound velocity $U_1$, while the actual switching on of the band pass filter occurs at a fluid velocity $U_2-$ slightly less than the upper bound velocity $U_2$ when the switching on of the particular band pass filter bounded by the velocities $U_1$ and $U_2$ occurs due to the decreasing fluid velocity. The lowest velocity band pass filter 28 becomes switched on when the fluid velocity becomes slightly greater than the minimum velocity $U_{min}$ and remains switched on as long as the fluid velocity varies within a subregion bounded by a velocity slightly less than $U_{min}$ and a velocity slightly greater than $U_1$. When the fluid velocity increases to a value in a subregion bounded by a value slightly greater than $U_1$ and a value slightly greater than $U_2$, the next lowest velocity band pass filter 29 becomes switched on and the lowest velocity band pass filter 28 becomes automatically switched off. It must be mentioned that the command signal generated from either the auxiliary flow signal or the primary flow signal effects the switching on of various band pass filters, while switching off of various band pass filters occurs in accordance with the logic built into the switching circuits shown in FIGS. 2, 3, 4 and 6, which logic makes only one band pass filter is switched on at one time and all of the remaining band pass filters become switched off as soon as the particular one band pass filter becomes switched on. When the mth band pass filters become switched on due to the increasing fluid velocity, the actual switching on occurs at a fluid velocity $U_m+$, while the actual switching on of the mth band pass filter occurs at a fluid velocity $U_m-$ when the switching on of the mth band pass filter takes place due to the decreasing fluid velocity because of the hysteresis. It is obvious that, since the upward and downward transitions between an adjacent pair of band pass filters occur respectively at two different transition velocities offset from one another by two times the value of hysteresis built into each individual comparator circuit, there will not take place the alternative and repeated cyclic transition between the adjacent pair of band pass filters even when the fluid velocity coincides with one of the transition velocities between the adjacent pair of band pass filters.

Figure 6:
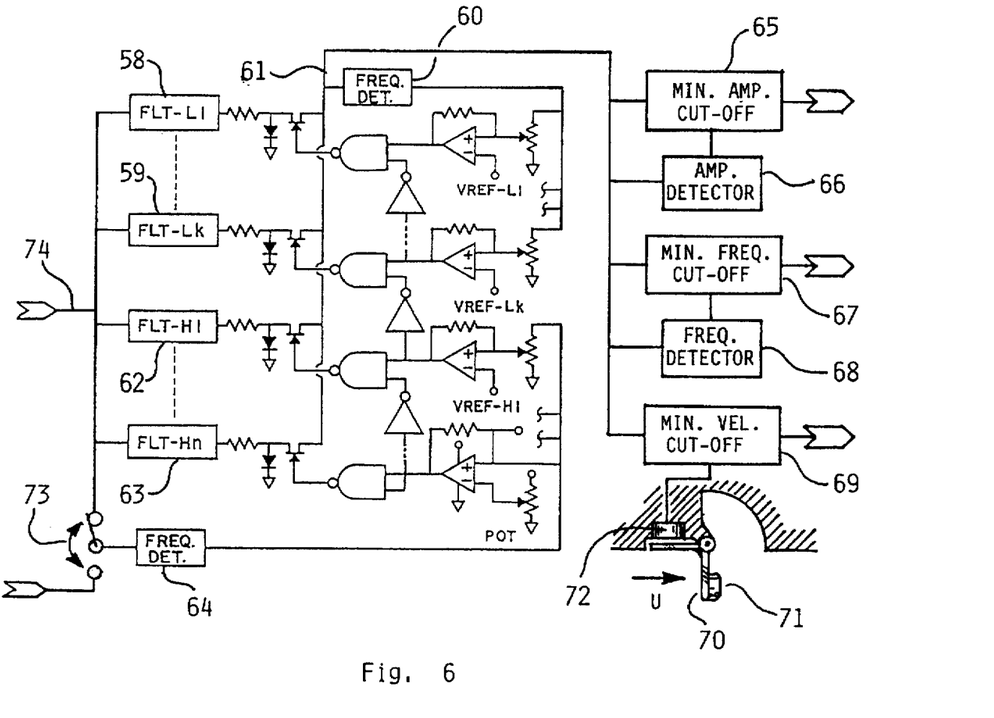
FIG. 6 illustrates a structural embodiment of a second stage parallel bank of filters that may be employed in conjunction with the compound electronic filter shown in FIG. 1 used as a first stage filter or as an accessory electronic filter providing a refined form of the primary flow signal for generating the command signal controlling the second stage parallel bank of filters.

In FIG. 6 there is illustrated a structural embodiment of the second stage parallel bank of filters 25 included in the embodiment shown in FIG. 1, that receives the output signal of the parallel bank of filters shown in FIG. 1, which second stage filter comprises a parallel combination of a first set of low frequency band pass filters 58, 59, etc. controlled by a command signal generated by a frequency to voltage converter 60 from a frequency of the primary flow signal detected at the output side 61 of the second stage filter, and a second set of higher frequency band pass filters 62, 63, etc. controlled by a command signal generated by a frequency to voltage converter 64 from a frequency of the primary flow signal detected at the input side of the second stage filter, that is the output side 24 of the parallel bank of filter shown in FIG. 1 being used as the first stage filter. It is readily noticed that the first set of band pass filters 58, 59, etc. operates on the same principles as those of the set of band pass filters shown in FIG. 3, while the second set of band pass filters 62, 63, etc. operates on the same principles as those of the set of band pass filters shown in FIG. 4. The minimum amplitude cut-off circuit 65 cuts off the output signal from the second stage filter when the amplitude of the output signal detected by the amplitude detector 66 is less than a preset minimum value. The minimum frequency cut-off circuit 67 cuts off the output signal when the frequency of the output signal detected by the frequency detetector 68 is less than a preset minimum frequency. The minimum velocity cut-off circuit 69 cuts off the output signal when the fluid velocity is less than a preset minimum value, below which minimum value the flap 70 stays at the resting position shown in the illustrative embodiment due to the counter weight 71 exerting a greater torque on the flap than the fluid dynamic torque experienced thereby, whereat a command signal originating from the proximity sensor 72 keeps the minimum velocity cut-off circuit at the open position. The second stage filter shown in FIG. 6 may be used in conjunction with the parallel bank of filters shown in FIG. 1 in the following two different combinations: The first combination is to use them as a first and second stage filter in a series combination as exemplified by the switch 73 at the position shown in FIG. 6, wherein the output end 24 of the parallel bank of filters shown in FIG. 1 is the input end of the second stage filter shown in FIG. 6. The second combination is provided when the switch 73 is flipped over to a position opposite to that shown in FIG. 6, wherein the output signal from the parallel bank of filters shown in FIG. 1 is supplied only to the frequency detector 64, while the primary flow signal provided by the vortex flowmeter or turbine flowmeter is supplied directly to the input end 74 of the second stage filter. It is readily recognized that the lowest frequency band pass filter 58 can be a low pass filter. The most preferred version of the second stage filter shown in FIG. 6 in terms of performance and economics is obtained when the first set of filters 58, 59, etc. is omitted, and the second stage filter comprising only the second set of filters 62, 63, etc. is used in the afore-mentioned series combination with the parallel bank of filters shown in FIG. 1 being used as the first stage filter. Of course, in such a series combination of the first and second stage filters, the plurality of band pass filters 62, 63, etc. must cover the entire frequency range in a continuous manner, and the lowest frequency filter may be a low pass filter instead of a band pass filter. The flow rate is determined from the frequency of the primary flow signal measured at the output side of the second stage filter.

Figure 7:
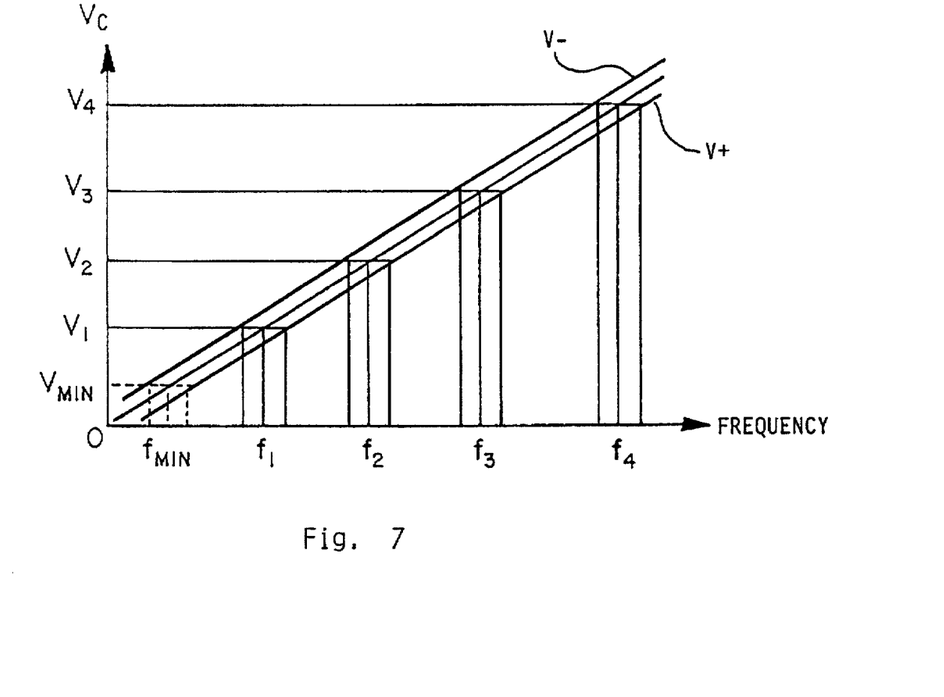
FIG. 7 illustrates principles of the control switching on and off one at a time the individual band pass filters included in the second stage parallel bank of filters shown in FIG. 6.

In FIG. 7 there is illustrated a relationship between the frequency of the primary flow signal and the threshold dc voltages switching on various band pass filters included in the second stage filter shown in FIG. 6. The different frequencies of the primary flow signal corresponding to different fluid velocities and generating the threshold dc voltages of different magnitudes switch on various band pass filters one at a time in the same manner as that described in conjunction with FIG. 5.

Figure 8:
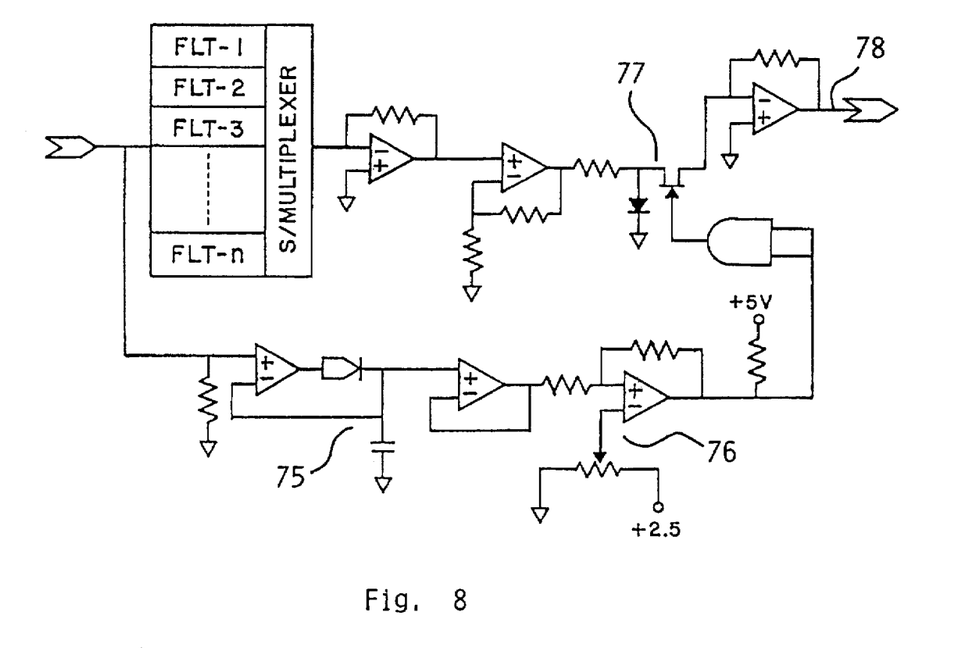
FIG. 8 illustrates a structural embodiment of the output cut-off electric circuit controlled by a command signal generated from the amplitude of the primary flow signal.

In FIG. 8 there is illustrated a structural embodiment of the minimum amplitude cut-off circuit. A signal level detector 75 detects the level of the primary flow signal, and a comparator 76 compares the detected level of the primary flow signal with a preset minimum value. When the detected level of the primary flow signal is less than the preset minimum value, the comparator 76 generates a command signal that opens the JFET switch 77, thereby cutting off the output signal 78.

Figure 9:
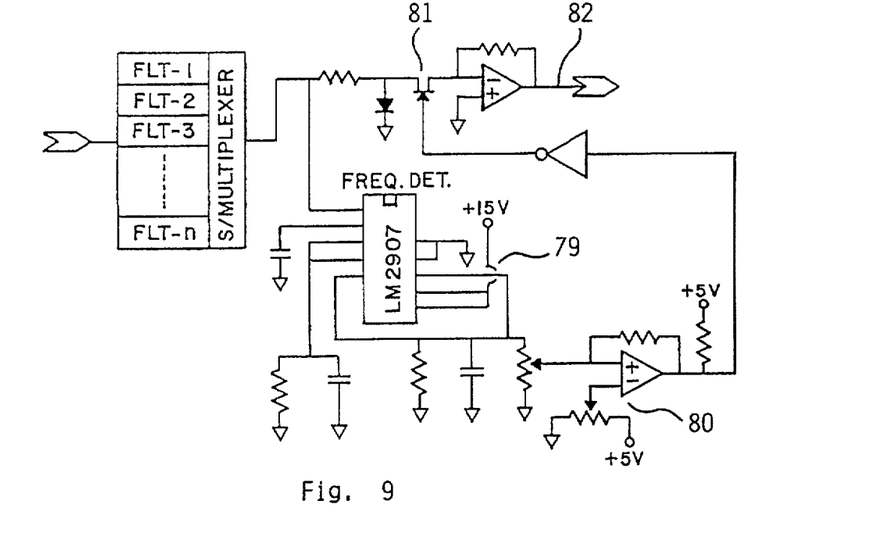
FIG. 9 illustrates a structural embodiment of the output cut-off electric circuit controlled by a command signal generated from the frequency of the primary flow signal.

In FIG. 9 there is illustrated a structural embodiment of the minimum frequency cut-off circuit. A frequency to voltage converter 79 generates a dc voltage, and a comparator 80 compares the magnitude of the dc voltage with a preset minimum value. When the magnitude of the dc voltage is less than the preset minimum value, the comparator 80 sends a command signal that opens the JFET switch 81, thereby cutting off the output signal 82.

Figure 10:
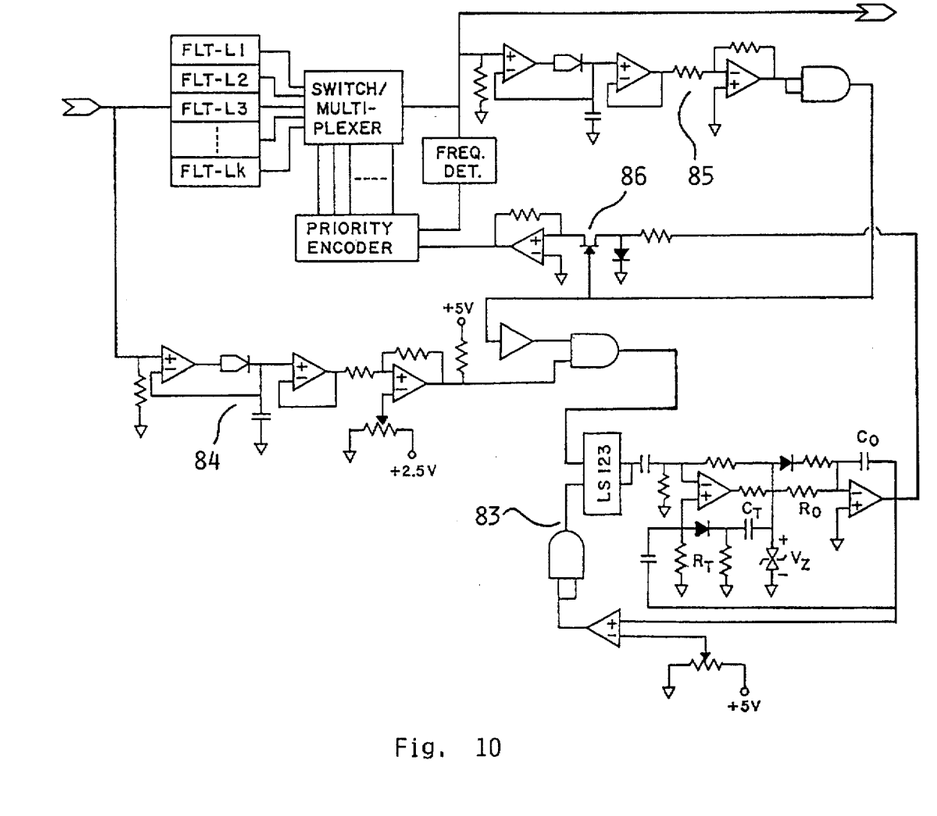
FIG. 10 illustrates a structural embodiment of the over-ride control system backing up the regular control system switching on and off one at a time the individual band pass filters included in the compound electronic filter shown in FIG. 1.

In FIG. 10 there is illustrated a structural embodiment of the over-ride scanner that re-establishes the locking on or tracking of the frequency of the primary flow signal in the stepwise mode in the operation of the compound electronic filter of the present invention. A ramp generator 83 generates a series of ramp dc voltages increasing from zero or a value equal to the threshold value of the command dc voltage assigned to the lowest frequency low pass or band pass filter to a maximum value equal to or greater than the threshold value of the command dc voltage assigned to the highest frequency band pass filter, when an input primary flow signal level detector 84 detects a value greater than a preset minimum value and an output primary flow signal level detector 85 fails to detect a value greater than a preset threshold value. The ramp dc voltage switches on and off one at a time the plurality of band pass filters included in the parallel bank of filters, that may be the parallel bank of filters shown in FIG. 1 or 6, in a sweeping or scanning mode starting with the lowest frequency band pass filter and ending with the highest frequency band pass filter, which sequential switching on and off of the individual band pass filters one at a time is repeated as long as the output primary flow signal level detected by the output signal level detector 85 does not exceed the preset threshold value. As soon as a value of the output primary flow signal level greater than the preset threshold value is detected by the output signal level detector 85, the JFET switch 86 shuts off the over-ride scanner 83, whereupon the plurality of band pass filters are controlled by the regular command signal generated from the auxiliary flow signal and/or the frequency of the primary flow signal. In the particular illustrative embodiment, the over-ride scanner 83 is turned on when a value of the input primary flow signal greater than a preset minimum value is detected and a value of the output primary flow signal greater than a preset threshold value is not detected. In an alternative design wherein the input signal level detector 84 is omitted, the over-ride scanner 83 is turned on when the output primary flow signal level detector 85 fails to detect a value greater than the preset threshold value.

Figure 11:
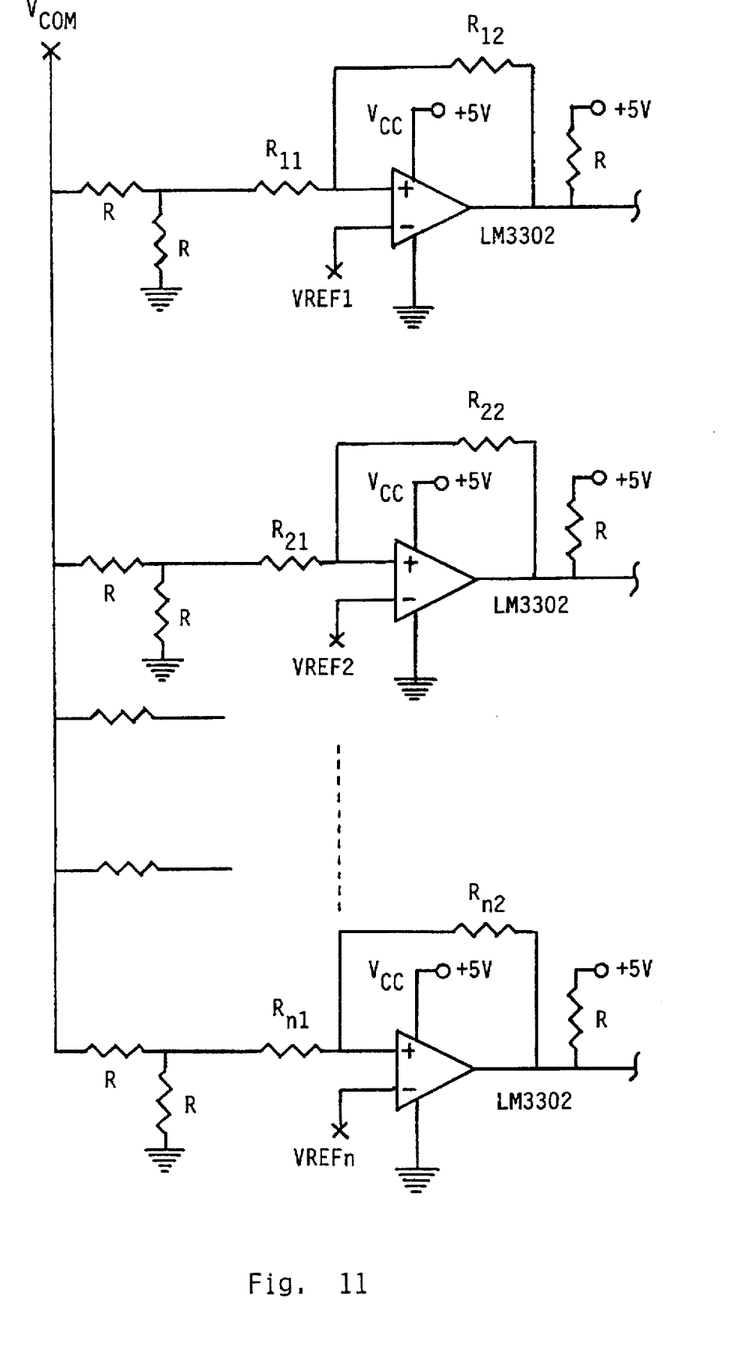
FIG. 11 illustrates an embodiment of the plurality of comparator circuits respectively controlling the switching on and off of the plurality of electronic switches respectively belonging to the plurality of band pass filters making up an electronic filter assembly of the present invention.

In FIG. 11 there is illustrated an embodiment of the plurality of the comparator circuits respectively controlling the switching on and off of the plurality of electric switches respectively belonging to the plurality of the band pass filters included in a parallel bank of the band pass filters. Each comparator circuit adds to or subtracts from the reference voltage a hysteresis voltage whereby effecting the transition from a band pass filter to another filter included in the parallel bank of filters of the present invention. In this particular embodiment of the comparator circuit, the hysteresis voltage added to or subtracted from the reference voltage set forth in the mth comparator circuit is equal to $$V_{HST} = \frac{R_{m1}}{R_{m1} + R_{m2}} V_{CC}, \qquad (1)$$

where $V_{CC}$ is the supply voltage that is set equal to +5 volts in the particular illustrative embodiment. Therefore, when the fluid velocity or the corresponding frequency increases from a lower value to a higher value by crossing over the lower bound of the mth band pass filter, the transition from a lower band pass filter to the mth band pass filter occurs at a fluid velocity or the corresponding frequency generating the command signal voltage of the following value:

$$\text{Command signal voltage} = VREF_m + \frac{R_{m1}}{R_{m1} + R_{m2}} \, V_{CC}. \quad (2)$$

When the fluid velocity or corresponding frequency decreases from a higher value to a lower value by crossing over the upper bound of the mth band pass filter the transition from a higher band pass filter to the mth band pass filter occurs at a fluid velocity or the corresponding frequency generating the command signal voltage of the following value:

$$\text{Command signal voltage} = VREF_m - \frac{R_{m1}}{R_{m1} + R_{m2}} \, V_{CC}. \quad (3)$$

Therefore, the upward transition between an adjacent pair of band pass filters occurs at a fluid velocity slightly higher than the fluid velocity whereat the downward transition between the adjacent pair of band pass filters occurs and, consequently, the occurrence of the alternative and repeated cyclic transition between an adjacent pair of band pass filters due to the fluid flow taking place at a velocity coinciding with borderline velocity between the adjacent pair of band pass filters is prevented and the error in the flow measurement originating from the distortion of the wave shape of the primary flow signal resulting from the alternative and repeated cyclic transition between an adjacent pair of band pass filters is eliminated. In an alternative design of the comparator circuit, the mode of transition from one band pass filter to another band pass filter can be changed in such a way that the downward transition to the mth band pass filter occurs when the fluid velocity or the corresponding frequency generates the command signal voltage given by equation (2), while the upward transition to the mth band pass filter occurs when the fluid velocity or the corresponding frequency generates the command signal voltage given by equation (3). The particular method described in conjunction with FIG. 11, that makes the upward and downward transition to an individual band pass filter to occur at two different fluid velocities separated from one another by a small and finite interval, is only one of many available designs well known to those skilled in the art of switching electric circuits and relays and, consequently, other designs may be employed in the practice of the present invention without departing from the teachings of the present invention.

The use of the compound electronic filter of the present inventions in conjunction with a well designed vortex flowmeter enables the vortex flowmeter to measure air flows under the standard condition as low as 1 meter per second and water flows as low as 0.1 meters per second. While the principles of the inventions have now been made clear by the illustrative embodiments shown and described, there will be many modifications of the structures, arrangements, proportions, elements and materials, which are immediately obvious to those skilled in the art and particularly adapted to the specific working environments and operating conditions in the practice of the inventions without departing from those principles. It is not desired to limit the inventions to the particular illustrative embodiments shown and described and accordingly, all suitable modifications and equivalents may be regarded as falling within the scope of the inventions as defined by the claims which follow.

The embodiments of the inventions, in which an exclusive property or privilege is claimed, are defined as follows:

1. A method for conditioning a primary flow signal generated in a flowmeter, comprising in combination:

a) generating a primary flow signal from a fluid flow by using a principal flow measuring device, and supplying the primary flow signal to an electronic filter assembly including a parallel combination of a plurality of electronic filters respectively having a plurality of electronic switches and respectively having different bandwidths; wherein each of the plurality of electronic filters selectively transmits an alternating electrical signal with frequencies distributed substantially within the bandwidth of said each electronic filter;

b) generating a command signal from the fluid flow by using a converting device converting fluid velocity to an electrical signal;

c) sending the command signal to the plurality of electronic switches; wherein the command signal closes one of the plurality of electronic switches belonging to one of the plurality of electronic filters having a bandwidth substantially including a frequency of the primary flow signal and opens said one electronic switch when the bandwidth of said one electronic filter substantially excludes the frequency of the primary flow signal, wherein the closing and opening of at least two of the plurality of electronic switches respectively belonging to two adjacent electronic filters of the plurality of electronic filters occur in a relationship wherein closing of the first of the two electronic switches and opening of the second of the two electronic switches occurs at a first value of the fluid velocity, and closing of the second of the two electronic switches and opening of the first of the two electronic switches occurs at a second value of the fluid velocity offset from said first value of the fluid velocity; and d) obtaining a conditioned form of the primary flow signal from an output end of the electronic filter assembly as an alternating electrical signal representing the fluid flow.

2. A method as defined in claim 1 wherein the command signal is generated from an auxiliary flow signal provided by an accessory flow level sensing device.

3. A method as defined in claim 1 wherein the command signal is generated from the frequency of the primary flow signal.

4. A method as defined in claim 1 wherein the command signal closing and opening a first group of the electronic switches belonging to a first group of the electronic filters with bandwidths covering a lower range of the fluid velocity is generated from an auxiliary flow signal by an accessory flow level sensing device, and the command signal closing and opening a second group of the electronic switches belonging to a second group of the electronic filters with bandwidths covering an upper range of the fluid velocity is generated from the frequency of the primary flow signal.

5. A method as defined in claim 1 wherein the command signal opens all of the plurality of electronic switches when a level of the fluid flow is less than a preset minimum value.

6. A method as defined in claim 1 wherein the electronic filter assembly includes an additional parallel combination of another plurality of electronic filters respectively having another plurality of electronic switches and respectively having different bandwidths in a series relationship to said a parallel combination of the electronic filters, wherein each of said another plurality of electronic filters selectively transmits an alternating electrical signal with frequencies distributed substantially within the bandwidth of said each electronic filter; and the method generates another command signal from the frequency of the primary flow signal and sends said another command signal to said another plurality of electronic switches, wherein said another command signal closes one of said another plurality of electronic switches belonging to one of said another plurality of electronic filters having a bandwidth substantially including the frequency of the primary flow signal, and opens said one electronic switch when the bandwidth of said one electronic filter substantially excludes the frequency of the primary flow signal.

7. A method as defined in claim 6 wherein said a command signal is generated from an auxiliary flow signal provided by an accessory flow level sensing device.

8. A method as defined in claim 6 wherein said a command signal is generated from the frequency of the primary flow signal.

9. A method as defined in claim 6 wherein said a command signal controlling the closing and opening of a first group of said a plurality of electronic switches belonging to a first group of said a plurality of electronic filters with bandwidths covering a lower range of the fluid velocity is generated from an auxiliary flow signal provided by a flow level sensing device, and said a command signal controlling the closing and opening of a second group of said a plurality of electronic switches belonging to a second group of said a plurality of electronic filters with bandwidths covering an upper range of the fluid velocity is generated from the frequency of the primary flow signal.

10. A method as defined in claim 6 wherein closing and opening of at least two of said another plurality of electronic switches respectively belonging to two adjacent electronic filters of said another plurality of electronic filters occur in a relationship wherein closing of the first of the two electronic switches and opening of the second of the two electronic switches occurs at a first value of the fluid velocity, and the closing of the second of the two electronic switches and opening of the first of the two electronic switches occurs at a second value of the fluid velocity offset from said first value of the fluid velocity.

11. An apparatus for generating and conditioning a primary flow signal representing flow rate of fluid comprising in combination:

a) an electronic filter assembly including a parallel combination of a plurality of electronic filters respectively having a plurality of electronic switches and respectively having different bandwidths; wherein each of the plurality of electronic filters selectively transmits an alternating electrical signal with frequencies distributed substantially within the bandwidth of said each electronic filter;

b) a principal flow measuring device generating a primary flow signal supplied to an input end of the electronic filter assembly;

c) means for generating a command signal from the fluid flow and sending the command signal to the plurality, of electronic switches respectively belonging to the plurality of electronic filters;

d) means for controlling closing and opening of each of the plurality of electronic switches in a relationship; wherein the command signal closes one of the plurality of electronic switches belonging to one of the plurality of electronic filters having a bandwidth substantially including a frequency of the primary flow signal and opens said one electronic switch when the bandwidth of said one electronic filter substantially excludes the frequency of the primary flow signal, wherein the closing and opening of at least two of the plurality of switches respectively belonging to two adjacent electronic filters of the plurality of electronic filters occur in a relationship wherein closing of the first of the two electronic switches and opening of the second of the two electronic switches occurs at a first value of the fluid velocity, and closing of the second of the two electronic switches and opening of the first of the two electronic switches occurs at a second value of the fluid velocity offset from said first value of the fluid velocity; and e) means for obtaining a conditioned form of the primary flow signal from an output end of the electronic filter assembly as an alternating electrical signal representing the fluid flow.

12. An apparatus as defined in claim 11 including an accessory flow level sensing device providing an auxiliary flow signal, and means for converting the auxiliary flow signal to the command signal.

13. An apparatus as defined in claim 11 including means for converting the frequency of the primary flow signal to the command signal.

14. An apparatus as defined in claim 11 including an accessory flow level sensing device providing an auxiliary flow signal, and means for converting the auxiliary flow signal to the command signal controlling the closing and opening of a first group of the plurality of electronic switches belonging to a first group of the electronic filters with bandwidths covering a lower range of the fluid velocity and means for converting the frequency of the primary flow signal to the command signal controlling the closing and opening of a second group of of the plurality of electronic switches belonging to a second group of the electronic filters with bandwidths covering an upper range of the fluid velocity.

15. An apparatus as defined in claim 11 wherein the command signal opens all of the plurality of electronic switches when a level of the fluid flow is less than a preset minimum value.

16. An apparatus as defined in claim 11 wherein the electronic filter assembly includes an additional parallel combination of another plurality of electronic filters respectively having another plurality of electronic filters and respectively having different bandwidths in a series relationship to said a parallel combination of electronic filters, wherein each of said another plurality of electronic filters selectively transmits an alternating electrical signal with frequencies distributed substantially within the bandwidth of said each electronic filter; and the apparatus includes means for generating another command signal from the frequency of the primary flow signal and sending said another command signal to said another plurality of electronic switches, wherein said another command signal closes one of said another plurality of electronic switches belonging to one of said another plurality of electronic filters having a bandwidth substantially including the frequency of the primary flow signal, and opens said one electronic switch when the bandwidth of said one electronic filter substantially excludes the frequency of the primary flow signal.

17. An apparatus as defined in claim 16 including an accessory flow level sensing device providing an auxiliary flow signal, and means for converting the auxiliary flow signal to said a command signal.

18. An apparatus as defined in claim 16 including means for converting the frequency of the primary flow signal to said a command signal.

19. An apparatus as defined in claim 16 including an accessory flow level sensing device providing an auxiliary flow signal, and means for converting the auxiliary flow signal to said a command signal controlling the closing and opening of a first group of said a plurality of electronic switches belonging to a first group of said a plurality of electronic filters with bandwidths covering a lower range of the fluid velocity and means for converting the frequency of the primary flow signal to said a command signal controlling the closing and opening of a second group of said a plurality of electronic switches belonging to a second group of said a plurality of electronic filters with bandwidths covering an upper range of the fluid velocity.

20. An apparatus as defined in claim 16 wherein closing and opening of at least two of said another plurality of electronic switches respectively belonging to two adjacent electronic filters of said another plurality of electronic filter occur in a relationship wherein closing of the first of the two electronic switches and opening of the second of the two electronic switches occurs at a first value of the fluid velocity, and closing of the second of the two electronic switches and opening of the first of the two electronic Switches occurs at a second value of the fluid velocity offset from said first value of the fluid velocity.

* * * * *